April 22, 1924.

P. DE MATTIA

COLLAPSIBLE CORE

Filed Aug. 8, 1922

WITNESSES

INVENTOR
PETER DE MATTIA
BY
ATTORNEYS

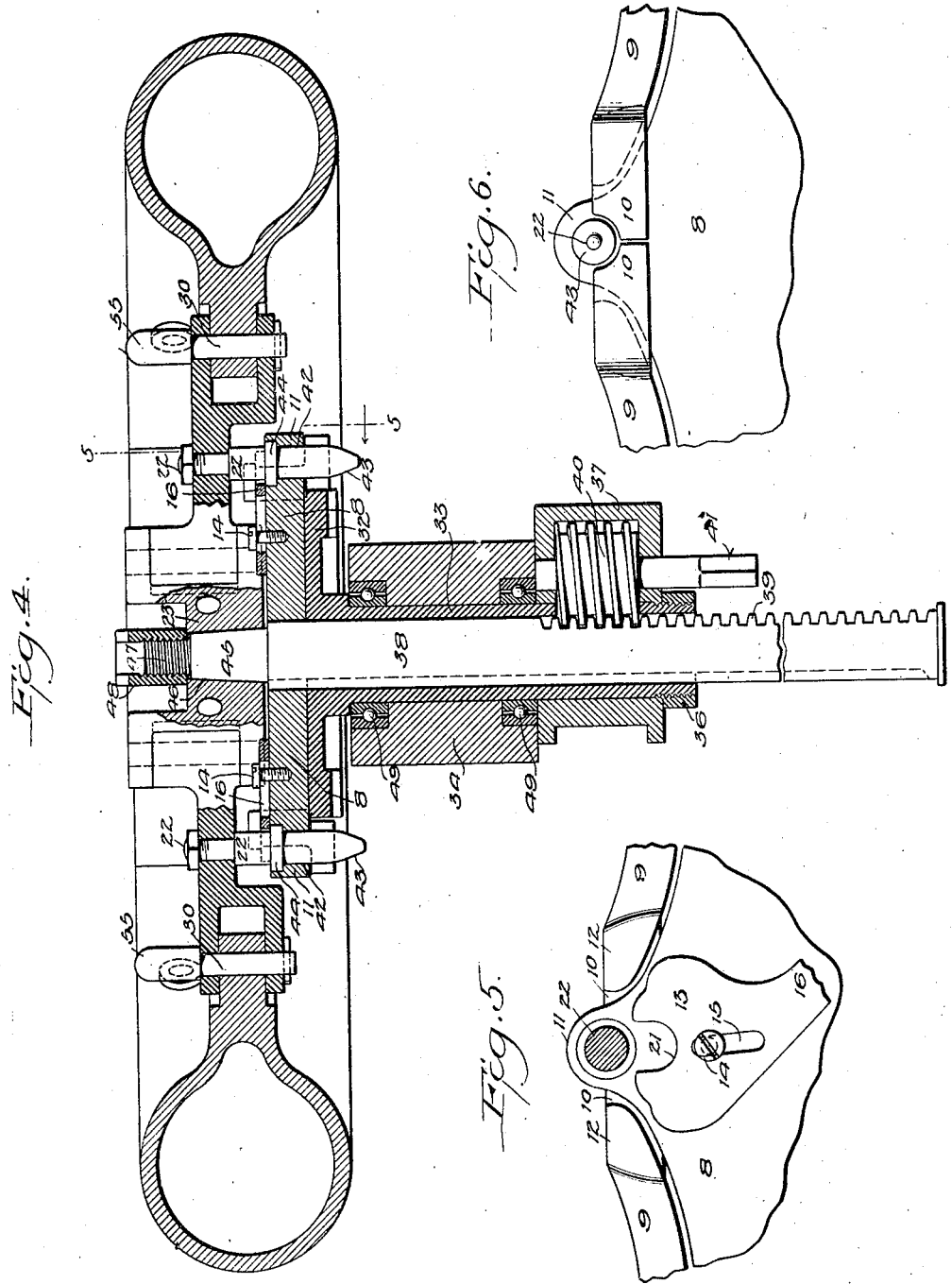

April 22, 1924.
P. DE MATTIA
COLLAPSIBLE CORE
Filed Aug. 8, 1922 5 Sheets-Sheet 3
1,491,681
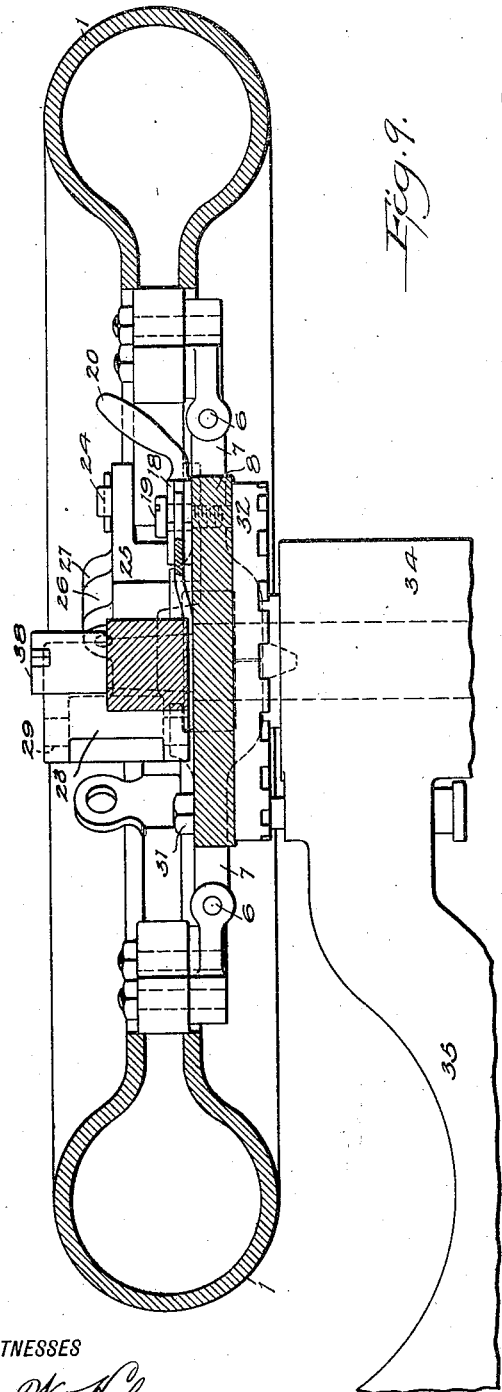
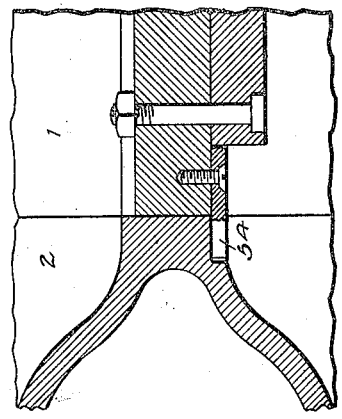
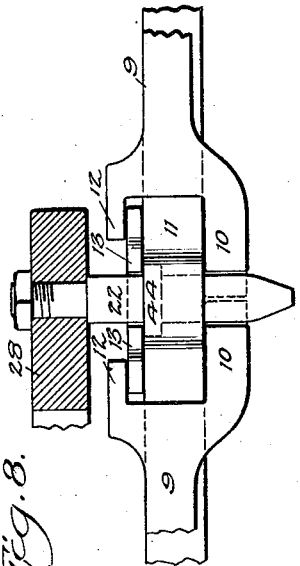
WITNESSES
INVENTOR
PETER DE MATTIA
BY
ATTORNEYS April 22, 1924.
P. DE MATTIA
COLLAPSIBLE CORE
Filed Aug. 8, 1922
1,491,681
5 Sheets-Sheet 4
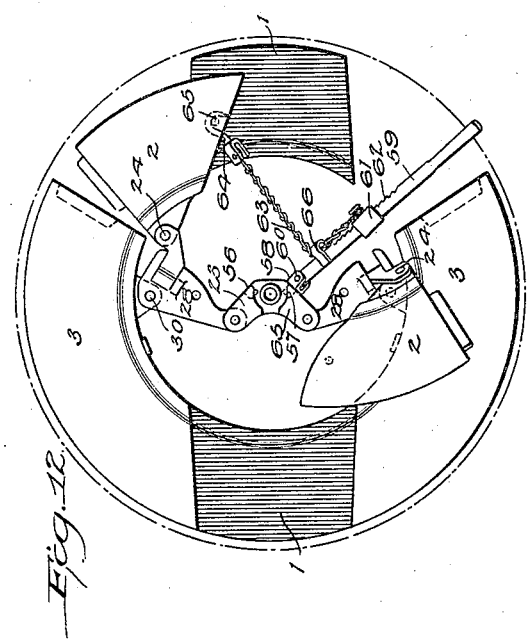
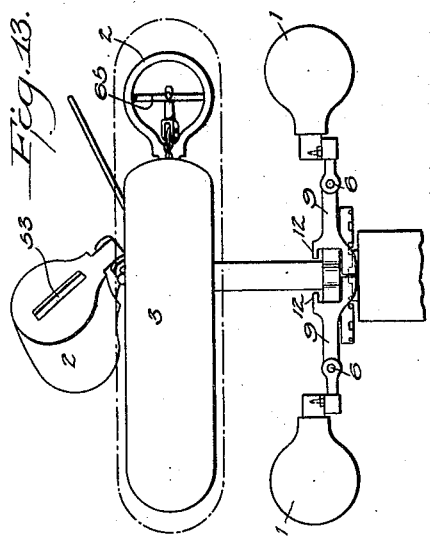
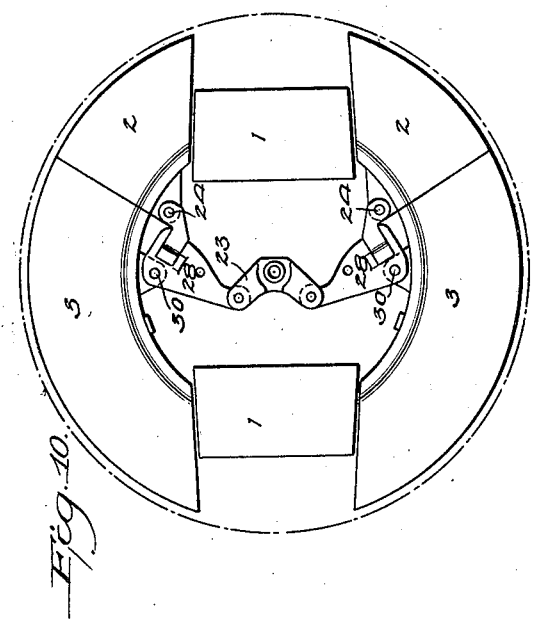
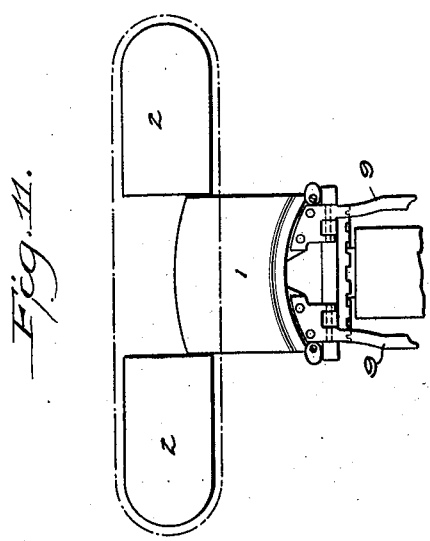
WITNESSES
INVENTOR
PETER DE MATTIA
BY
ATTORNEYS April 22, 1924.
P. DE MATTIA
COLLAPSIBLE CORE
Filed Aug. 8, 1922
1,491,681
5 Sheets-Sheet 5
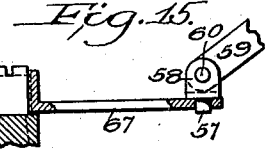
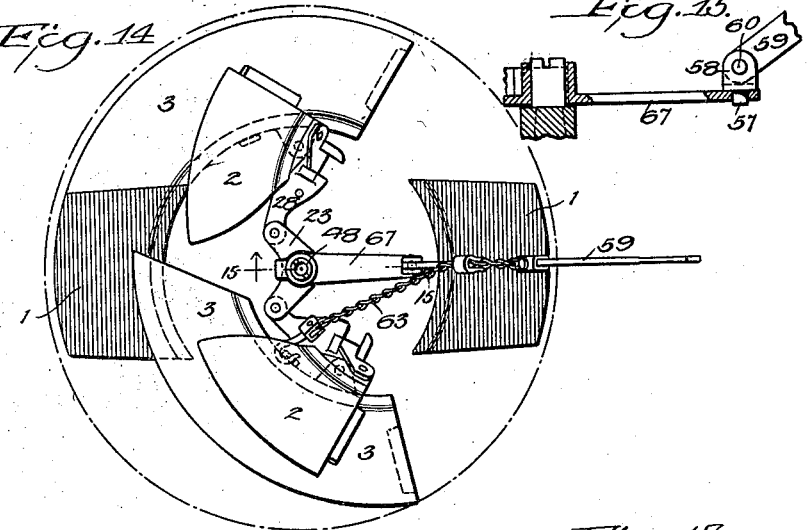
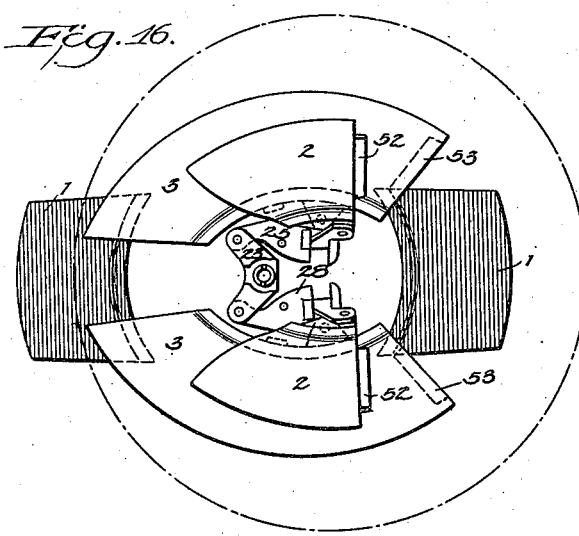
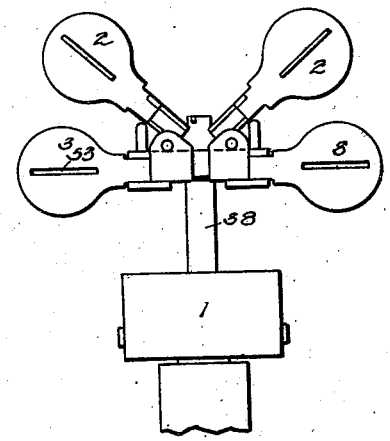
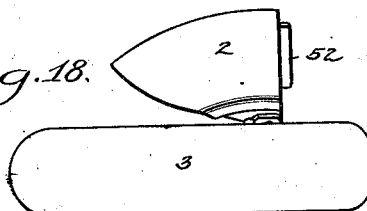
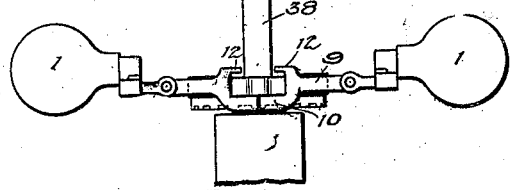
WITNESSES
INVENTOR
PETER DE MATTIA
BY
ATTORNEYS Patented Apr. 22, 1924.

1,491,681

UNITED STATES PATENT OFFICE.

PETER DE MATTIA, OF CLIFTON, NEW JERSEY, ASSIGNOR TO DE MATTIA BROS., OF GARFIELD, NEW JERSEY, A CORPORATION OF NEW JERSEY.

COLLAPSIBLE CORE.

Application filed August 8, 1922. Serial No. 580,465.

*To all whom it may concern:*

Be it known that I, PETER DE MATTIA, a citizen of the United States, and a resident of Clifton, in the county of Passaic and State of New Jersey, have invented certain new and useful Improvements in Collapsible Cores, of which the following is a full, clear, and exact description.

The present invention relates to collapsible cores employed in the manufacture of pneumatic tires.

The object of the present invention is to produce a collapsible core so constructed that the segmental sections may be collapsed to a maximum degree, and thus facilitate the separation of the core and tire formed thereon no matter what the size of the tire may be.

In large tires the central opening is relatively small, and as a consequence there is but a limited field within which to manipulate the movable parts of the core in removing the core sections from the tire. The object of the present invention is to produce a collapsible core so constructed, that the segmental sections may be removed from the tire with a minimum distortion thereof, and whereby the sections are moved in such relation to each other that a maximum freedom of movement of the various segmental sections may be produced, and at the same time produce a maximum retraction or collapse of the parts, thus greatly facilitating the separation of the tire and core with a minimum distortion of the tire.

A further object of the invention is to provide means for insuring the absolute rigidity of the parts when the segmental core sections are assembled in operative continuity, while at the same time providing for that flexibility of operation which is required.

With the foregoing objects in view, the present invention consists of the collapsible core and the devices and combinations of devices which will be hereinafter described and claimed.

The invention is illustrated in the accompanying drawings in which—

Fig. 4 is a vertical sectional view taken through the core and its support on the line 4—4 in Fig. 1, the central shaft and other parts being shown in elevation.

Fig. 5 is a view similar to Fig. 3, illustrating the bolt retracted.

Fig. 6 is a fragmentary detail of a part of the table which supports the key sections, and of portions of the retaining arms of such key sections.

Fig. 7 is a cross sectional view through the core taken on the line 7—7 in Fig. 1, a portion of the jack arm and other parts being shown in elevation.

Fig. 8 is a fragmentary detail partly in elevation and partly in section, illustrating the means for connecting the chuck members when the core sections are in operative continuity.

Fig. 9 is a fragmentary cross sectional detail taken on the line 9—9 in Fig. 1.

Fig. 10 is a diametric plan view showing one of the chuck members and its connected core sections, and also showing the key sections in the position which they will occupy after the initial collapsing movement, the tire being indicated by the dotted circle.

Fig. 11 shows a side elevation of the parts shown in Fig. 10, illustrating diametrically the position of the core sections after the initial collapsing movement, and indicating in dotted lines, the tire.

Fig. 12 illustrates diametrically in plan view, the collapsing of the compound pivoted core sections, the shaded portions indicating the position of the key sections after they have been removed from the tire.

Fig. 13 shows in side elevation the position of the parts as shown in Fig. 12. In both of these figures the tire is indicated in dotted lines.

Fig. 14 shows in plan view, the collapsing or retracting of one of the swinging sections of the core, other parts being shown diametrically.

Fig. 15 shows a fragmentary detail, parts being shown in section, of the detachable retracting instrumentalities.

Fig. 16 shows in plan, the position of the parts after the key sections have been removed from the tire and the other sections have been retracted and collapsed to the maximum, and showing in dotted lines the relative position of the tire and parts at this time.

Fig. 17 shows in elevation and more or less diametrically, the relative position of the parts of the core when wholly retracted as in Fig. 16.

Fig. 18 is a side elevation of the parts shown in Figs. 16 and 17.

Similar reference characters will be employed throughout the specification and drawings to designate corresponding parts.

Figure 1:
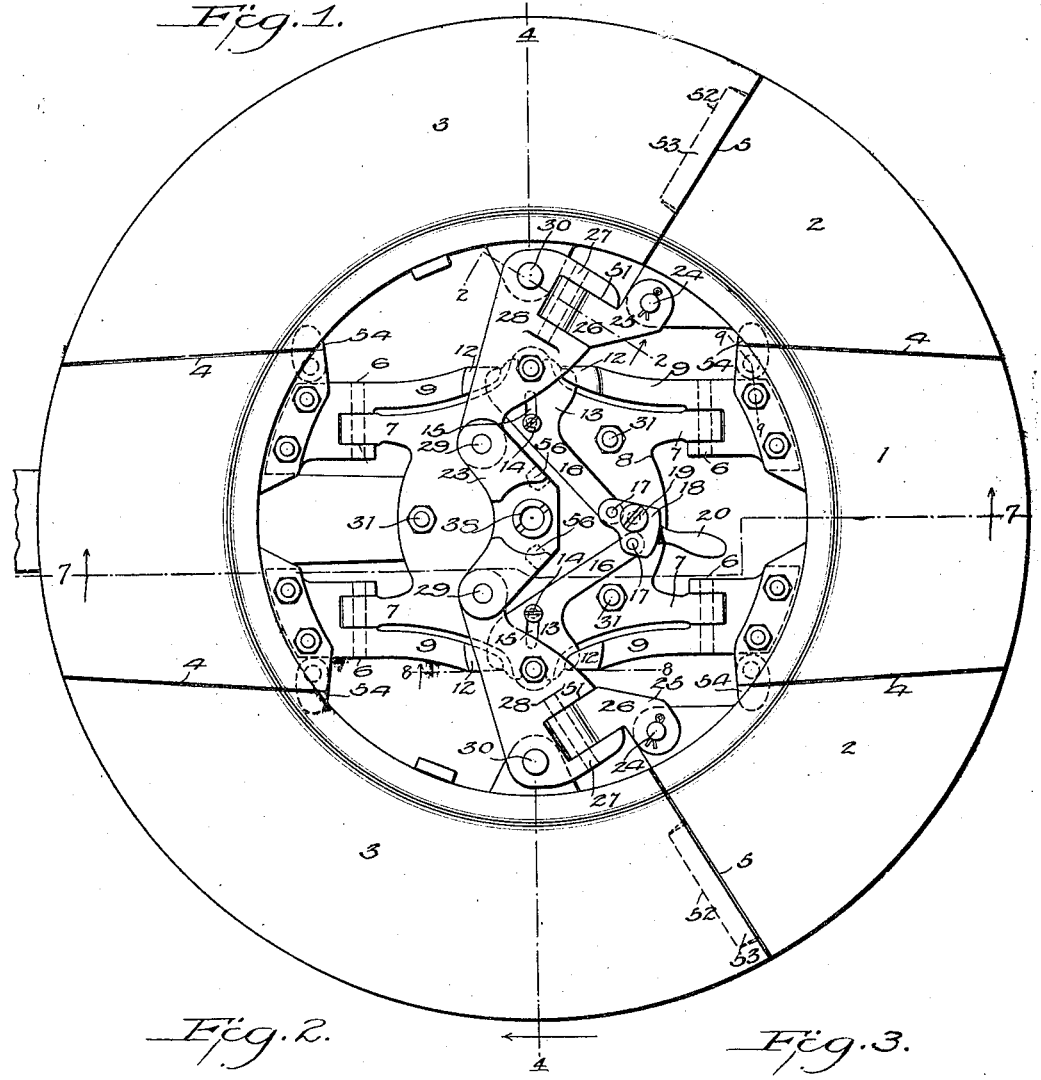
Fig. 1 shows a top plan view of the core with the parts in operative continuity.

In the drawings there is shown a collapsible core formed of six segmental sections, there being two key sections 1, located diametrically opposite each other, two compound pivoted sections 2 located adjacent one of the key sections, and two relatively long swinging pivoted sections 3 interposed between the pivoted sections 2 and the other key section. As indicated, the joints 4 between the key sections 1, and the adjacent sections 2, will preferably converge from the inner toward the outer peripheries, while the joints 5 between the sections 2 and the sections 3 are formed approximately radially.

Figure 3:
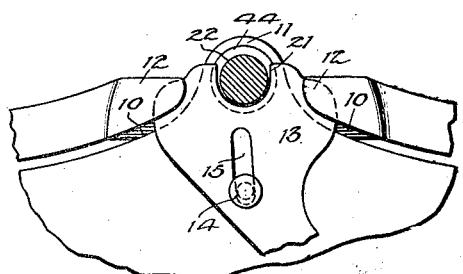
Fig. 3 is a fragmentary detail showing one of the locking bolts which hold the key sections of the core in operative continuity.

The key sections 1 are pivotally mounted at 6 to arms 7 extending from a plate 8 forming part of the chuck, the arrangement being such that the key sections may swing upwardly about the pivots 6 into and out of a horizontal plane. It is intended that they shall not be permitted to swing downwardly below a horizontal plane, and to prevent this downward swing each of the key sections is provided with inwardly projecting arms 9, which at their inner ends are provided with lugs 10 arranged to engage the under surface of projections 11 of the plate 8 (see Figs. 1, 3 and 8.) In order that the key sections shall be held rigidly when they are depressed or when they are in the position shown in Figs. 1 and 7, the arms 9 are also provided with overhanging lugs 12 (see Fig. 8), which are arranged to be engaged by the sliding bolts 13, as shown clearly in Figs. 1, 3 and 8. The overhanging lugs 12 are shorter than the lugs 10, so that they may clear the projections 11 of the plate 8, in their downward movement. The bolts 13 are mounted upon the upper surface of the plate 8, by means of headed screws 14 passing through slots 15 in said bolts, and they are provided with angularly disposed arms 16 which are pivoted at 17 to a block 18, the block being pivotally mounted at 19 to the plate 8 and provided with a handle 20 by means of which the block 18 may be turned about its pivot 19 to retract or advance the bolts 13 as desired. The bolts 13, at their forward ends, are provided with notches 21 (see Figs. 3 and 8), arranged to engage pins or studs 22, the arrangement being such that the studs 22 and the notches 21 cooperating with the slots 15 and the screws 14 will insure a radial movement of the bolts 13, while at the same time permitting a rocking movement of the arms 16 of the bolts. When the bolts are extended as shown in Fig. 1, the key sections 1 will be held in the plane of the core and in operative continuity with the other core sections, but when it is desired to permit the withdrawal of the key sections from the tire, the bolts 13 will be retracted, thus releasing the lugs 12 of the arms 9.

The sections 2 are what might be termed compound pivotal sections. Each of them is pivoted as at 24, to an arm 25 of a lever 26, and the levers 26 are in turn pivoted as at 27, to levers 28 which are pivotally connected at 29 to the chuck plate 23. The pivots 24 and 27 are at right angles to each other, whereby the sections 2 may be swung inwardly about the pivots 24, and thereafter swung upwardly about the pivots 27, as indicated in Fig. 12 of the drawings.

The sections 3 are pivotally connected at 30, to the levers 28, so that the sections 3 may not only partake of the inward movement caused by the rocking of the levers 28 about the pivots 29, but also so that they may have a pivotal movement about the pivots 30. This arrangement of the sections is such that the key sections 1 have a movement up and down, into and out of the plane of the core, the sections 2 have an inward movement and an upward movement into and out of the plane of the core, so that they may be caused to rest upon the sections 3 as shown in Fig. 16, and the sections 3 may be swung inwardly and contracted as shown in Fig. 16.

The chuck plate 8 is held by means of bolts 31 to the upper surface of a table 32, the said table being provided with a cylindrical or tubular bearing 33 mounted to turn in a bearing 34 forming part of the jack 35 (see Fig. 7), and held therein by a nut 36 engaging its lower end. A housing 37 is mounted upon the tubular bearing 33, between the nut 36 and the lower end of the bearing 34. The upper chuck plate 23 is mounted upon a spindle 38 which passes freely through the tubular bearing 33 (see Fig. 4), and is provided with a worm gear 39 which is engaged by a worm 40 mounted to turn in the housing 37, and provided with a polygonal stem 41, whereby it may be turned to raise or lower the spindle 38 as required. The arrangement is such that through the worm and worm gear the spindle 38 of the chuck plate 23 may be raised and lowered with respect to the chuck plate 8, and carries with it the sections 2 and 3 and the levers 28 and intermediate connections between such levers and the sections 2 and 3, while the chuck plate 8 remains stationary, all for a purpose which will be hereinafter described. The levers 28 carry the studs 22 and the free ends of the studs 22 have a sliding engagement with openings 42 in the chuck plate 8, the studs 22 being tapered at their lower ends, as shown at 43, and provided with collars 44 arranged to take into countersunk recesses in the upper surface of the chuck plate 8 at the upper ends of the openings or apertures 42, the arrangement being such that when the studs 22 are in engagement with the openings in the chuck plate, the levers 28 are prevented from having any movement about the pivots 29, and no such movement can be had until the spindle 38 has been raised upwardly a sufficient distance to enable the studs 22 to entirely clear the chuck plate 8, and as the collars 44 will be under the bolts 13 the chuck plates cannot be separated until said bolts are retracted.

The chuck plate 23 is fitted to the upper end of the spindle 38 which is tapered as shown at 45, the chuck plate being provided with a tapered bearing 46 to fit the tapered end 45 of the spindle, which latter has a threaded extension 47 receiving a nut 48 whereby the chuck plate 23 is fixedly secured to the upper end of the spindle 38. The table 32 which carries the chuck plate 8 is intended to be revolved freely, and in order to reduce the friction, or resistance to revolution, to a minimum, the bearing 34 is provided with suitable ball or anti-friction bearings 49.

Figure 2:
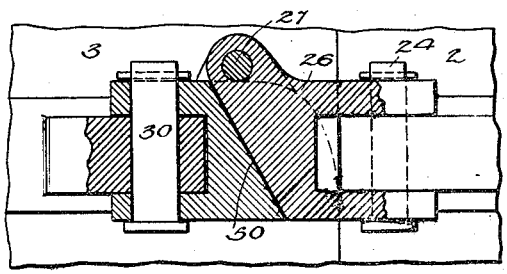
Fig. 2 shows a fragmentary sectional view taken on the line 2—2 in Fig. 1, looking in the direction of the arrow in that figure.

As shown in Fig. 2 of the drawings, the levers 26 carrying the sections 2 will be pivoted in such manner to the levers 28 that inclined abutting shoulders 50 will be provided between the levers 26 and the back of the recesses 51 formed in the levers 28, in which the levers 26 are mounted, the inclined shoulders 50 being below the pivots 27, so that the levers 26 may be turned upwardly with relation to the plane of the core, but will not be permitted to turn downwardly, thus materially adding to the rigidity of the device when the parts are in operative continuity, while at the same time permitting absolute freedom of movement to the sections 2 in collapsing the core.

Preferably, the meeting ends of the sections 2 and 3 will be provided with interlocking tenons and grooves 52 and 53, and also, preferably, the key sections 1 will be provided with the offset lugs 54 designed to engage the adjacent sections 2 (see Fig. 9 of the drawing). The pivots 30 forming the connections between the sections 3 and the levers 28 may be extended upwardly as shown at 55 to form handles or knobs which may be grasped to rock the levers 28 about the pivots 29, to impart inward and outward movements to the sections 3.

The chuck plate 23 will also be provided with sockets 56 to receive a stud 57 carried by a coupling 58 to which a lever 59 is pivotally connected at 60 (see Fig. 15). This lever 59 is provided with an adjustable slide 61 movable along the lever 59 and held thereto by the teeth 62, the slide carrying a chain 63, the free end of which is provided with a hook 64. Each of the sections 2 is provided with a cross-pin or other device 65 with which the hook 64 may be engaged, and with the pin 57 seated in one of the sockets 56 and the slide 61 properly adjusted along the lever 59, a rocking movement of the lever, about the pivot 60 will pull the sections 2 out of the tire. The chain 63 passes through a guide 66 carried by the lever 59. It will of course be understood that having removed one of the sections 2 from the tire, the lever will be shifted to the other socket in the chuck plate 23 and coupled up to the other section 2 to be removed. After the sections 2 have been removed and turned up as shown in Figs. 14, 16 and 18, a plate or arm 67 will be connected to the upper end of the spindle 38, said plate having a socket at its forward end, to receive the stud 57, whereby the lever 59 may be connected to the plate 67, for the purpose of drawing the sections 3 out of the tire, as indicated in Fig. 14 of the drawings.

In operation, assuming that the parts are in the position as shown in Fig. 1, and that a tire has been formed thereon, by grasping the handle 20 and rocking it in the direction of the arrow shown in Fig. 1, the sliding bolts 13 are retracted, thus releasing the arms 9 of the key sections 1, and also releasing the bolts 22 carried by the levers 28. Thereafter, by turning the worm 40, the spindle 38 is moved upwardly within the tubular sleeve 33, thus raising the chuck plate 23 and the levers 28, with the sections 2 and 3 of the core. This movement of the sections 2 and 3 above the plane of operative continuity of the parts causes the sections 1 to be rocked about their pivots 6. Thus, the sections 1 will be withdrawn from the tire, and when the sections 2 and 3, with the tire, have reached a point above the operative plane of sections 1, sufficiently to cause the sections 1 to be entirely withdrawn from the tire, they will be released and drop backward into the plane of the chuck plate 8. This leaves the tire supported by the sections 2 and 3 at opposite diametrical points. This position of the parts is indicated in Figs.

10 and 11. Thereafter, by means of the lever 59, its chain and hook, the sections 2 are withdrawn from the tire, the movement being first inward about the pivots 24 as a center, and having once cleared the tire they are moved upwardly to a position above the sections 3, this movement being illustrated in Figs. 12 and 13. Having removed the sections 2 and placed them above the sections 3, then the lever 59 is connected to the plate 67, and by means of its chain and hook, the sections 3 are withdrawn from the tire and brought to the position shown in Fig. 16, which shows the maximum collapsing movement of the parts, and at this point the tire, as shown in dotted lines in Fig. 16, will not be entirely free of the ends of the sections 3, at the left of that fig. but by lifting the tire up and shifting it laterally to the left it will be entirely disengaged from the core, after which the sections will be returned to normal position, and by lowering the chuck plate 23 the core sections will be brought into operative continuity, this movement causing the studs 22 to engage the openings in the chuck plate 8 after which, by shifting the bolts 16, the arms of the key sections 1 will be locked, and also the levers 28 locked to the chuck plate 8.

I claim:

1. A collapsible core, comprising a plurality of segmental core sections arranged in groups of pairs, a relatively fixed carrier for one pair of such sections, and a relatively movable carrier for the other sections, and pivoted levers supporting a pair of the sections mounted on the movable carrier.

2. A collapsible core, comprising a plurality of segmental core sections arranged in groups of pairs, a relatively fixed carrier for one pair of such sections, and a relatively movable carrier carrying two pairs of such sections, and pivoted levers supporting the pairs of sections mounted on the movable carrier, one section of each pair mounted on the movable carrier having a pivotal action into and out of the plane of the other section of the pair.

3. A collapsible core, comprising a relatively fixed chuck plate, a core section pivoted thereto and movable into and out of the plane of operative continuity, a movable chuck plate movable towards and from the fixed chuck plate, core sections connected to the movable chuck plate and arranged to be contracted and expanded, and a locking device arranged to lock the plates against relative movement and the sections in operative continuity.

4. A collapsible core, comprising a plurality of groups of segmental sections, one pair of such groups pivoted for a vertical swinging movement, and another pair of such groups pivoted for a horizontal swinging movement.

5. A collapsible core, comprising a fixed chuck plate, a pair of diametrically disposed core sections pivoted thereto to swing into and out of the plane of the core, a movable chuck plate carrying other core sections, means to move the movable chuck plate and core sections, and a locking device mounted on the fixed chuck plate to lock the plates against movement and the sections of the core in operative continuity.

6. A collapsible core, comprising swinging levers, a pair of core sections pivoted thereto to swing inward and outward, and locking bolts to hold the levers in their outward position.

7. A collapsible core, comprising a plurality of segmental core sections, two of the sections movable into and out of the plane of the core, and two of the sections mounted to move at right angles to the movement of the other two sections.

8. A collapsible core, comprising a plurality of segmental core sections, two of such sections carried by a fixed chuck plate, means whereby said sections may be moved at right angles to the plane of the core, a movable chuck plate, levers pivoted thereto, a pair of core sections pivoted to the levers, and another pair of core sections also pivoted to the levers, the pivots or axes of movement being at right angles to each other.

9. A collapsible core, comprising a pair of pivoted levers, core sections pivoted thereto to swing with the levers and independently thereof, and another pair of core sections pivotally mounted on said levers to swing at right angles to the movement of the levers, and also in and out of the plane of the core.

10. A collapsible core, comprising a rotary table, a chuck plate mounted thereon, segmental core sections diametrically disposed with relation to each other and pivotally supported by said chuck plate, a movable chuck plate, a spindle supporting said movable chuck plate, core sections mounted on said movable chuck plate, studs carried by said movable chuck plate and arranged to engage the fixed chuck plate, and locking bolts supported by said fixed chuck plate to engage said studs.

11. A collapsible core, comprising a chuck plate, a core section pivoted thereto to swing at right angles to the plane of the plate, extensions or arms carried by said core section, a stop carried by the arms and engaging the underside of the chuck plate and overhanging lugs positioned to be engaged by sliding bolts.

12. A collapsible core, comprising a core section having an expanding and contracting movement, a core section pivotally supported with relation to the first named core section, and a pivotal connection whereby the latter core section can be moved into and out of the plane of the first named core section, and positioned over and coincident with the same.

13. A collapsible core comprising a core section mounted to move into and out of the position of and plane of operative continuity, a fixed support therefor, and a core section mounted to move into and out of the plane of operative continuity on an independent support and to move with relation to the position of operative continuity in its own plane but in a plane parallel to the plane of operative continuity.

<div style="text-align:right">PETER DE MATTIA.</div>